OPERATOR CALL TRANSFER AND OVERLAP CALL SWITCHING EQUIPMENT

Filed Nov. 29, 1968 7 Sheets-Sheet 1

INVENTORS
R. M. MORRIS
J. M. REPHOLZ
BY Frederick W. Padden
ATTORNEY

OPERATOR CALL TRANSFER AND OVERLAP CALL SWITCHING EQUIPMENT

Filed Nov. 29, 1968

7 Sheets-Sheet 2

Nov. 10, 1970 R. M. MORRIS ET AL 3,539,733

OPERATOR CALL TRANSFER AND OVERLAP CALL SWITCHING EQUIPMENT

Filed Nov. 29, 1968 7 Sheets-Sheet 3

Nov. 10, 1970 R. M. MORRIS ET AL 3,539,733

OPERATOR CALL TRANSFER AND OVERLAP CALL SWITCHING EQUIPMENT

Filed Nov. 29, 1968 7 Sheets-Sheet 6

OPERATOR CALL TRANSFER AND OVERLAP CALL SWITCHING EQUIPMENT

Filed Nov. 29, 1968

United States Patent Office 3,539,733
Patented Nov. 10, 1970

3,539,733

OPERATOR CALL TRANSFER AND OVERLAP CALL SWITCHING EQUIPMENT

Robert M. Morris, Spring Lake Heights, N.J., and John M. Repholz, New York, N.Y., assignors to Bell Telephone Laboratories, Incorporated, Murray Hill and Berkeley Heights, N.J., a corporation of New York
Filed Nov. 29, 1968, Ser. No. 779,932
Int. Cl. H04m *3/00*
U.S. Cl. 179—27 22 Claims

ABSTRACT OF THE DISCLOSURE

Operator position equipment is disclosed including primary and secondary trunks for receiving incoming calls and position circuits for controlling the automatic transfer of calls on the primary and secondary trunks to a supervisor position over trunks shared by a plurality of operator positions. The position circuit is arranged for automatically switching an operator telephone from the primary to the secondary trunk which is shared by a plurality of positions for serving calls on an overlap basis while a call on the primary trunk is served by the supervisor. Apparatus is provided for automatically switching the operator telephone back to the primary trunk after the supervisor has served the transferred call and an overlap call has been completed.

BACKGROUND OF THE INVENTION

This invention relates to switching systems, and particularly to equipment utilized in a telephone system for simplifying the tasks performed by operators in transferring calls to a supervisory operator and in serving other calls on an overlap basis following a call transfer.

Telephone operators achieve by training and experience a high degree of proficiency in efficiently fulfilling substantially all customer requests for directory assistance and other services. Occasionally, however, the information supplied by a customer is inadequate for enabling an operator to satisfy the customer request. In such a situation, it is a customary practice for the operator to consult with her supervisor to obtain assistance and when desirable to transfer the customer call to the supervisor for service.

Prior art equipment furnished for operator positions serving information and other classes of calls have included primary and secondary trunks for switching calls from a telephone switching network to operators for service. Each primary trunk is individually reserved for exclusively use by one operator and each secondary trunk is shared by a group of operators for serving calls on an overlap basis. In addition, a plurality of supervisory trunks are furnished for enabling operators to consult with their supervisor and to transfer calls on the primary and secondary trunks to the supervisor for special assistance.

A problem in such prior art equipment is that many manual operations with keys, cords and other switching apparatus have heretofore been required of an operator to transfer customer calls on primary and secondary trunks to the supervisor position. Moreover, after a call transfer on a primary trunk further manual operations are needed for enabling an operator to serve calls on an overlap basis over a shared secondary trunk and for subsequently resuming call service on the primary trunk after both the transferred and overlap calls are served. Furthermore, each operator generally has the additional functions of testing and supervising the availability of primary and secondary trunks as well as the trunks to the supervisor before selecting and engaging the trunks for serving calls. Obviously, such manual operations and supervisory tasks tend to reduce the operator efficiency and speed of serving customer calls and increase the labor content of the operator duties as well as the holding time of telephone switching facilities.

In view of the foregoing, it is an object of our invention to improve operator procedures and facilities for transferring calls from operator to supervisor positions and for serving calls on an overlap basis.

Another object is to improve operator efficiency and the speed of serving customer calls by lessening the number of manual operations and supervisory tasks performed by operators for transferring calls on primary and secondary trunks over shared trunks to a supervisor position.

A further object related to the immediately preceding one is to simplify the functions which enable an operator to serve overlap calls on a shared secondary trunk and to resume call service on a primary trunk after both a transferred call on the primary trunk and an overlap call on the secondary trunk have been served.

SUMMARY OF THE INVENTION

In accordance with principles of this invention, equipment is provided for enabling an operator to serve customer calls over primary and secondary trunks and to effect under key control the automatic transfer of such calls to a supervisor position over trunks shared by a plurality of operator positions. The equipment includes an operator position control circuit for automatically switching operator telephone headset facilities from the primary to the secondary trunk for serving calls on an overlap basis while a transferred call on the primary trunk is served by the supervisor. The circuitry eliminates the need for operator testing and supervision over the trunk by automatically switching the operator telephone facilities back to the primary trunk after the supervisor has served the transferred call and an overlap call has been completed on the secondary trunk.

The exemplary embodiment of our invention is integrated into a telephone system which is advantageously utilizable as a call distributor system for serving customer directory assistance calls and other operator-served calls for department store ordering, airline reservations and the like. The illustrative call distributor switches such calls through a telephone switching network via trunk circuits and primary and secondary trunks to position control circuits for service by an operator. Each of the primary trunks is individually connected to one position control circuit and exclusively connects calls to only one operator position. Each secondary trunk is shared by a plurality of operators for serving calls on an overlap basis. It is a feature of our invention that each illustrative position control circuit is effective for automatically transferring, or connecting, each of the primary and secondary trunks to a supervisor posititon, or console, via a pair of supervisor trunks and a trunk selection and distribution circuit in response to key operations by a transferring operator.

The position control circuit is equipped with facilities for enabling an operator to place a temporary hold condition on a call on the primary and secondary trunks while the operator consults with her supervisor to obtain assistance. Following the inception of such a hold condition, the operator without any testing on her part automatically receives from the position control circuit a signal informing her of the busy-idle status of the pair of trunks to the supervisor. In response to an indication that at least one of the supervisor trunks is idle, the operator activates the position control circuit for controlling the trunk selection and distribution circuit automatically to connect a preferred idle one of the supervisor trunks to the respective primary or secondary operator trunk having the call to be served by the supervisor. According to an aspect of our invention, a first one of the pair of supervisor trunks is associated with a first group of operator positions and when idle is preferred over the other one of the supervisor trunks. The latter trunk is treated as an overflow trunk to the supervisor which is less preferred than the first supervisor trunk and is associated with a larger group of operator positions than the operator group associated with the first supervisor trunk. Large groups of operators are selectively assigned to the supervisor trunks based on the fact that calls to a supervisor are few in number and relatively short in duration.

It is a feature of our invention that the position control circuit comprises apparatus which is effective under control of a single key at the associated operator position for automatically switching or transferring a held call on either the primary or secondary trunks to a selected one of the supervisor trunks for serving the held calls. After such automatic switching operations are completed for a call on the primary trunk, the operator selectively activates the position control circuit to transfer further supervision over the transferred call to the supervisor and thereafter to bid for the use of the shared secondary trunk to serve calls on an overlap basis.

Advantageously, the illustrative position control circuit provides facilities for a preference and lockout arrangement to enable the shared secondary trunk to be used by only one operator position at a time for overlap call service. After one preferred position is connected to the secondary trunk and serves a call thereon, the preference and lockout arrangement enables that position to continue exclusively to serve other overlap calls on the secondary trunk until the secondary trunk is either transferred to the supervisor or the primary trunk becomes again available for serving calls. It is a feature of our invention that, when the secondary trunk is transferred to a supervisor and she completes serving the call, the preference and lockout arrangement selectively allows another operator position sharing the secondary trunk to obtain preference for use of the secondary trunk. In the latter case, the priorly preferred position is disconnected from the secondary trunk which thereafter is connected to the newly preferred position while the priorly preferred position awaits the completion of a transferred call on its associated primary trunk or the secondary trunk again becomes idle. The secondary trunk is held by an operator position on overlap call service for a relatively short time from a traffic standpoint because the operator primary trunk is generally made quickly available by expeditious call service from a supervisor operator.

Accordingly, the position control circuit is equipped for automatically transferring the operator telephone facilities from the secondary to the primary trunk as soon as both the transferred and overlap calls have been served. The automatic reconnection virtually eliminates the need for an individual operator to supervise the busy-idle status of the primary trunk preparatory to resuming call service on the primary trunk as well as prior art manual operations to effect the reconnection to the primary trunk. In addition, the automatic operations increase the operator call serving capacity and provides efficient fast call service to the customer. Importantly, the automatic switching reduces the holding time of the secondary trunk and other complex and costly switching facilities of the telephone system.

It is another aspect of our invention that the position control circuit provides the operator with visual indications as to the primary or secondary trunk which is currently enabled for serving calls. Such indications are automatically provided during call switching and transfer operations on the primary and secondary trunks. In addition, the operator is automatically furnished with visual indications as to the availability of at least one of the two shared trunks to the supervisor console.

Another feature of our invention is that timer facilities are furnished in the position control circuit for the timed disconnect, or position release, from the secondary trunk to minimize the probability of prematurely cutting off a new overlap call thereon following the serving of a prior overlap call and the availability of the primary trunk for call service. The timer facilities protect against the premature cutoff by controlling the position availability signals transmitted over the primary and secondary trunks preparatory to the resumption of operator call service on the primary trunk and following the completion of an overlap call on the secondary trunk.

DRAWING DESCRIPTION

The foregoing and other objects, features and advantages of our invention will be more fully understood from a reading of the following descriptions with reference to the drawing in which.

GENERAL DESCRIPTION

Figure 1:
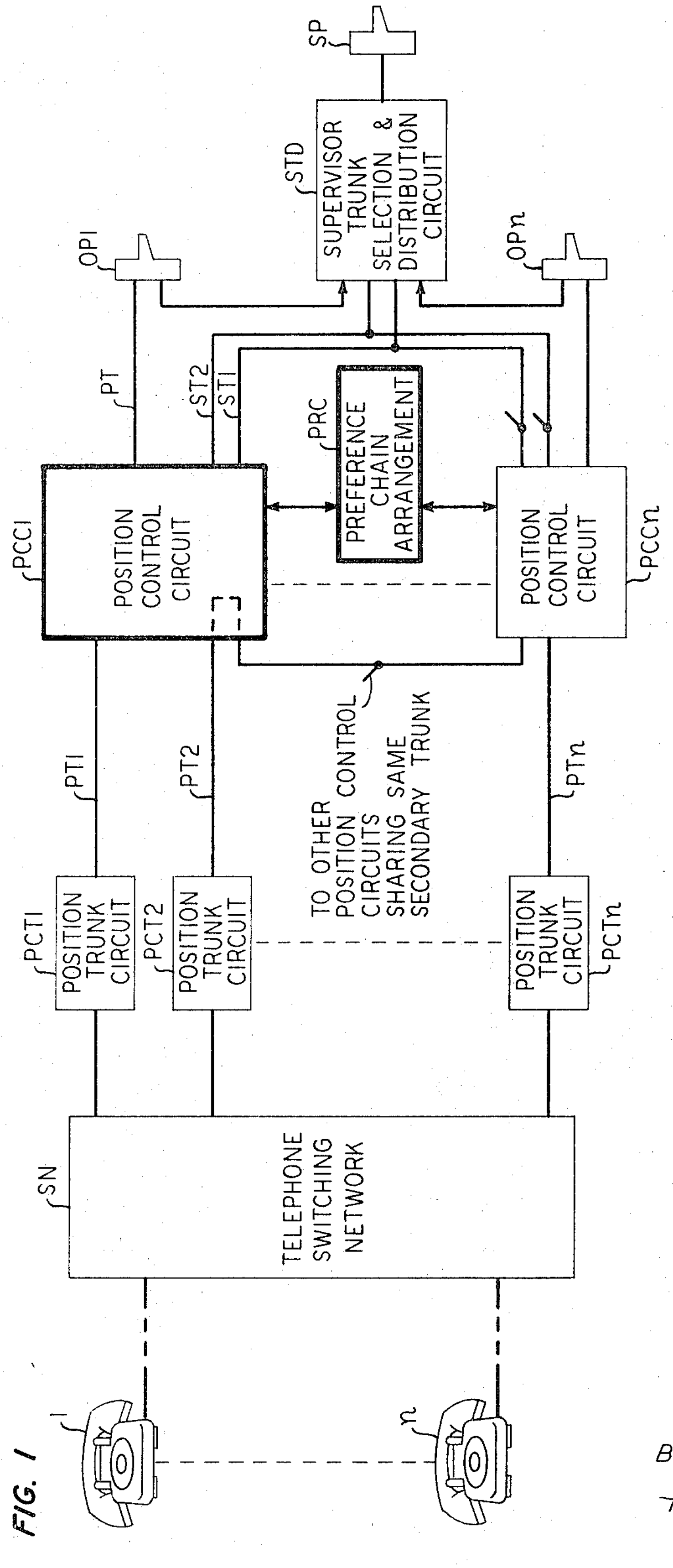
FIG. 1 is a block diagram showing operator position control circuits connected via primary and secondary position trunks and trunk circuits to a telephone switching network for serving customer calls and subsequently switching such calls to a supervisor position via supervisor primary and secondary trunks and a trunk selection and distribution circuit.
Figure 8:
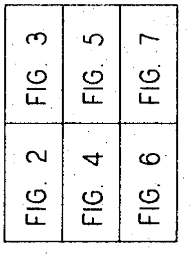
FIG. 8 depicts the position in which FIGS. 2–7 should be placed to show the full schematic drawing.

Referring to FIG. 1, a brief description is presented of the functional cooperation of the various circuit blocks used in providing for the connection of customer calls to an operator position over a primary trunk and a secondary trunk shared by a plurality of operator positions. Telephone calls from the stations 1–*n* are illustratively switched through a telephone switching network SN in a known manner for connection to trunk circuits PCT1–PCT*n*. Each such trunk circuit is connected over an individual one of the trunks PT1–PT*n* to respective position control circuits PCC1–PCC*n*.

Trunks PT1 and PT*n* illustratively are primary trunks each of which is exclusively connected to one of the respective control circuits PCC1 or PCC*n* for switching calls to the respective operator position OP1 or OP*n*. In contrast, trunk PT2 is shared by position OP1 and a plurality of other operator positions including position OP*n* for serving calls on an overlap basis when a call on the respective trunk PT1–PT*n* is transferred to a supervisor position SP.

Each of the primary and secondary trunks PT1–PT*n* is selectively connectable to supervisor position SP via a supervisor trunk selection and distribution circuit STD and two supervisor trunks ST1–ST2 under control of each of the position control circuits PCC1–PCC*n*. In accordance with an aspect of our invention, supervisor trunk ST1 is a preferred trunk for connecting calls from position control circuits PCC1–PCC*n* toward the supervisor position SP and, based on call serving abilities of a supervisor and traffic conditions, it is illustratively shared by a first group of operator positions. Trunk ST2 serves a second group of operator positions which illustratively is larger than the first group and is less preferred than the supervisor trunk ST1 for connecting calls on trunks PT1–PT*n* toward position SP.

Turning now to the processing of calls over a primary and secondary trunk, it is illustratively assumed that operator position OP1 has just become available for serving a call. Accordingly, the position control circuit PCC1 sends a supervisory signal over primary trunk PT1 to activate trunk circuit PCT1 for indicating to network SN of the position availability. Primary trunk PT1 serves each subsequent call received on trunk circuit PCT1 until such a call is transferred to supervisor position SP. Prior to such a transfer, the secondary trunk PT2 is available for overlap call service by other sharing operator positions, such as position OP*n*.

Upon receiving a call from network SN via trunk circuit PCT1 and primary trunk PT1, circuit PCC1 switches it to an operator at position OP1 for service. After the call is completed, the caller ordinarily hangs up first and causes the call connections to be released whereupon trunk circuit PCT1 again indicates to network SN that position OP1 is available for serving another call. If, however, a customer requests or an operator determines the need for the assistance of a supervisor on a call, the operator selectively activates a key (not shown) for causing control circuit PCC1 to split, transmissionwise, the trunk PT1 from the position OP1. Next, the operator activates another key (not shown) which causes the supervisor trunk selection and distribution circuit STD both to select one of the supervisor trunks ST1 or ST2 for connection between positions OP1 and SP and, advantageously, to operate position control circuit PCC1 automatically to complete such interconnections.

From a traffic standpoint, trunks ST1 and ST2 are shared by many operator positions because operator-to-supervisor calls or vice versa are relatively infrequent and short in duration. The selection and distribution circuit STD ordinarily selects primary trunk ST1, if idle, for interconnecting a requesting one of the positions OP1–OP*n* and position SP or the secondary trunk ST2 if trunk ST1 is busy. When both trunks ST1 and ST2 are busy, circuit STD lights a lamp in each position control circuit sharing the busy trunks to alert the operators of the unavailability of the supervisor and to inform them not to initiate a request for connection to the supervisor until after the lamp is extinguished.

Following the interconnection of positions OP1 and SP via trunk ST1 or ST2, the operators communicate for the needed assistance and if warranted to transfer the call on primary trunk PT1 top osition SP. The operator at position OP1 initiates such a transfer by releasing the splitting key for activating the position control circuit PCC1 to bridge the call on trunk PT1 onto the connections toward position SP. Next, the operator at position OP1 actuates a release key (not shown) which activates circuit PCC1 to transfer supervision over the call to the position SP and to initiate a bid for a connection to the secondary trunk PT2.

According to a feature of this invention, a preference control arrangement PRC is provided by apparatus in each of the position control circuits sharing the same secondary trunk PT2 for enabling only one such circuit automatically to obtain exclusive use of trunk PT2 for serving calls on an overlap basis while a call on the operator primary trunk is transferred to position SP. After a bid made by circuit PCC1 gains preference for the use of the shared trunk PT2, circuit PCC1 automatically connects itself exclusively to trunk PT2 for enabling position OP1 to serve calls thereon. In addition, circuit PCC1 then sends a position available signal over trunk PT2 for causing circuit PCT2 to enable network SN to extend a call thereto.

A call subsequently extended to trunk PT2 is switched through control circuit PCC1 to position OP1 and is served by the operator. Upon its completion, the call is disconnected as a result of a caller hang-up or a position release. Prior to such a disconnect, however, the operator at position OP1 is advantageously able to communicate with a supervisor at position SP and is furnished with facilities for automatically transferring such calls to position SP. The manner in which such communication and call transfer are accomplished for a call on trunk PT2 is essentially the same as those priorly described with respect to a call on trunk PT1. It is emphasized that, according to our invention, supervisor trunks ST1 and ST2 are both selectively available for connection to secondary trunk PT2.

After an operator at position OP1 completes serving a call on trunk PT2, the switching action taken by circuit PCC1 following a call transfer or disconnect depends upon the busy-idle status of the primary trunk PT1. If trunk PT1 is busy, control circuit PCC1 is illustratively arranged to remain exclusively connected to trunk PT2 under control of the preference chain arrangement PRC. It is noted that once trunk PT2 becomes exclusively associated with control circuit PCC1, the trunk continues to serve calls until trunk PT1 becomes idle and is not again made available for use by other operator positions until after trunk PT1 becomes idle or until its release on a call thereon is transferred to position SP. When trunk PT1 becomes available, supervisory signals are sent over trunk PT2 to effect the release of completed call connections and to make trunk PT2 available for use by other operator positions in the same sharing group. The telephone facilities of position OP1 are then automatically reconnected to the primary trunk PT1 for enabling the operator again to serve calls thereon.

DETAILED DESCRIPTION

Figure 2:
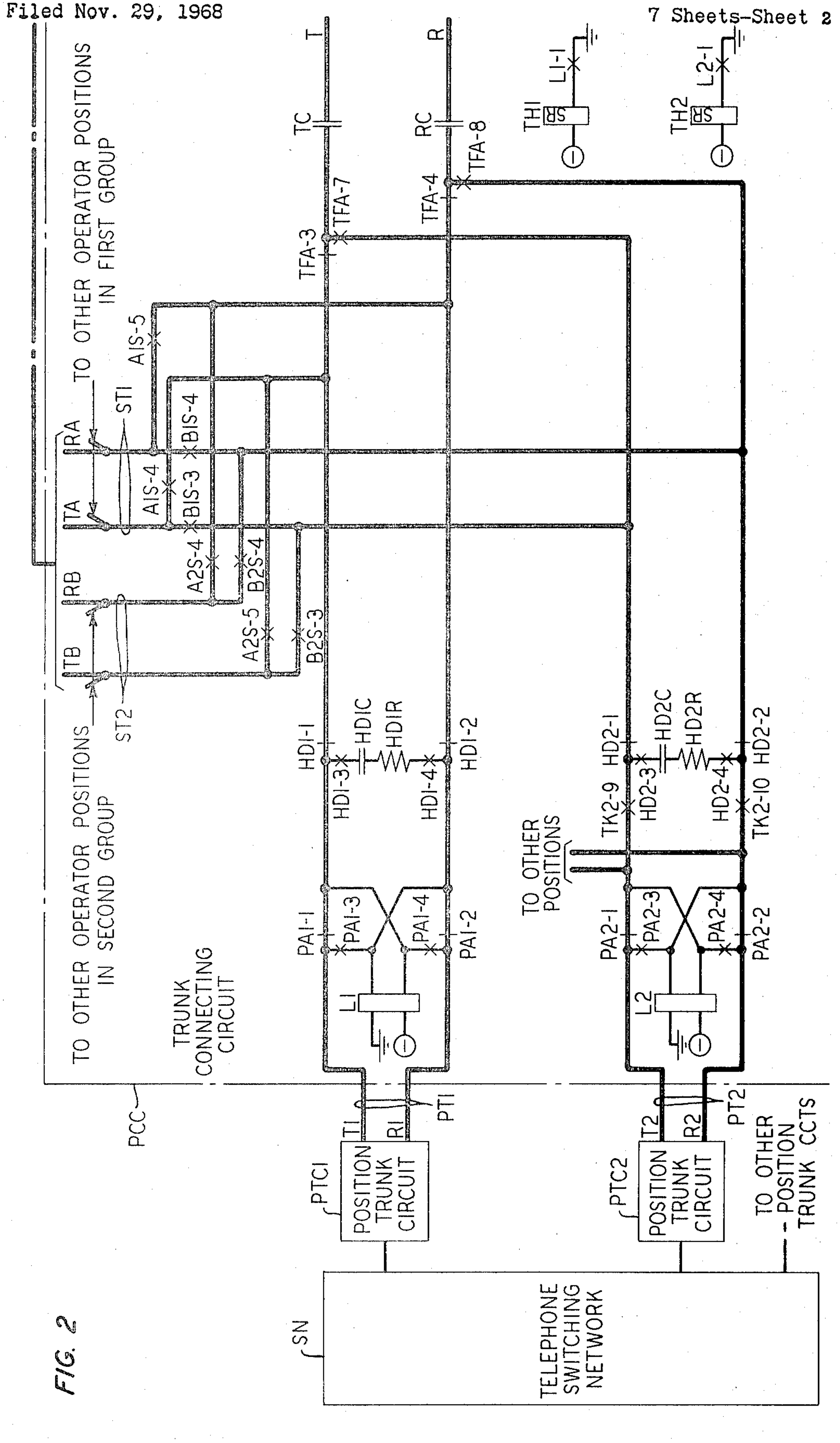
FIGS. 2 through 7 show in block and schematic form the structural details of the position control circuit PCC1 of FIG. 1 interconnected with other structural elements of the system.
Figure 3:
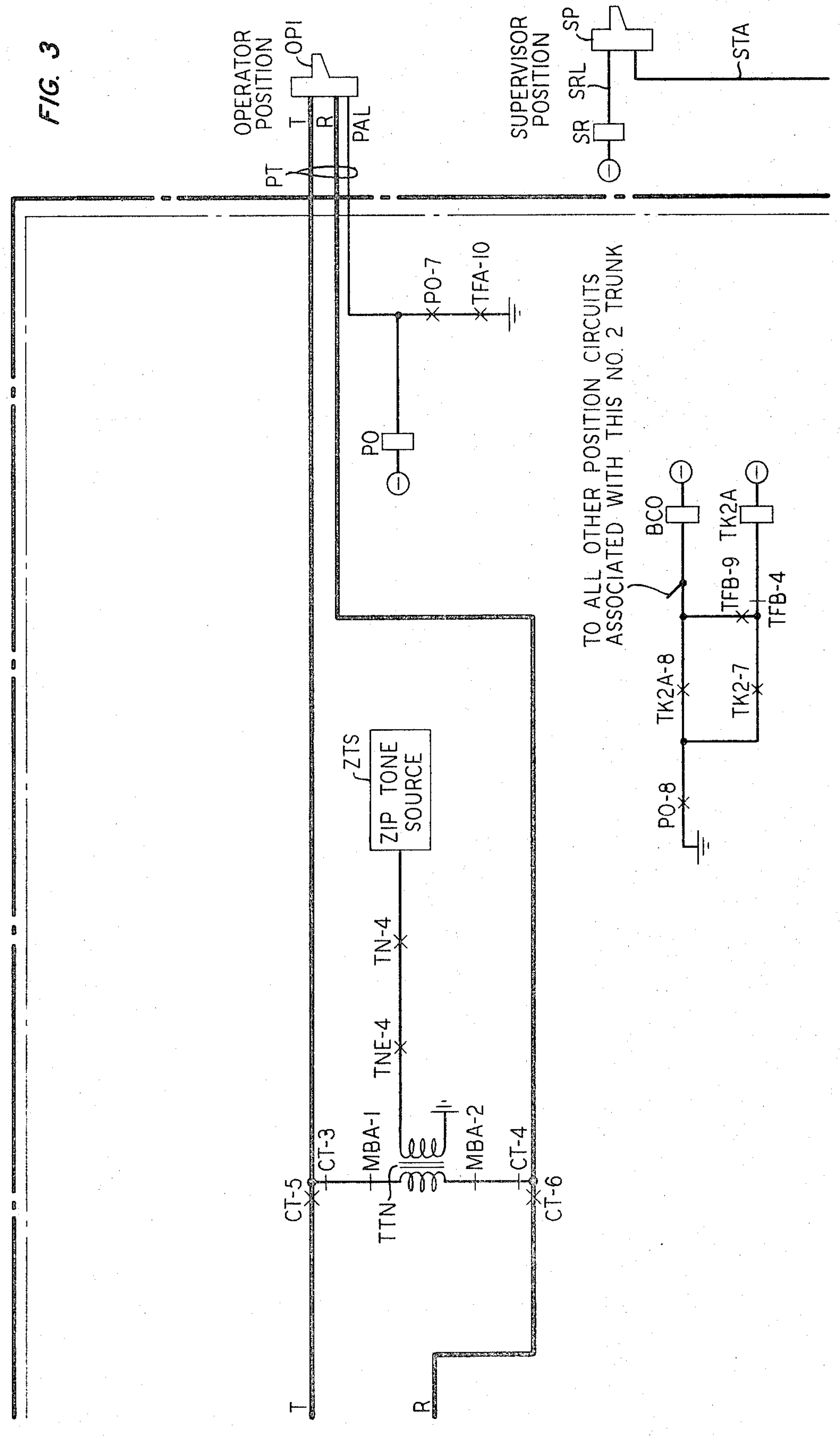

Referring now to FIGS. 2–7, a detailed description is presented of the circuit operations involved in providing for the connection of incoming calls to an operator position OP1 of FIG. 3 over a primary trunk PT1 and a secondary trunk PT2 shared by a plurality of operator positions. FIGS. 2–7 show only the structural details of one position control circuit PCC1 and the signaling and control conductors over which it is interconnected with telephone switching network SN of FIG. 2 via position trunk circuits PCT1 and PCT2 as well as a supervisor trunk selection and distribution circuit STD of FIG. 5. Although the position control circuit PCC1 is shown as a separate unit from position OP1, it is noted that circuit PCC1 advantageously includes a plurality of keys and lamps such as key HK and lamp TRK1L of FIG. 7 which are located conveniently for operator use in serving calls at the position OP1.

POSITION OP1 AVAILABLE

After an operator occupies the position OP1 of FIG. 3, position control circuit PCC1 is activated for extending subsequent incoming calls on trunk PT1 to position OP1. Specifically, a ground signal is applied from position OP1 to conductor PAL for operating a position-occupied relay PO of FIG. 3 over the path through its winding to negative potential. In operating, relay PO activates relay TNE of FIG. 4 in preparation for controlling the duration of a zip tone signal which is supplied to position OP1 upon a subsequent receipt of an incoming call. Relay TNE is activated via its upper winding and contacts TN–1, CT–1, PR–1 and PO–1 to ground. In operating, relay TNE closes its contacts TNE–1 which connects both ends of its lower winding together for magnetically increasing its release time in a well-known manner. The activation of relay TNE, in turn, operates relay PA1 of FIG. 6 for reversing the polarity on the tip and ring conductors T1 and R1 of trunk PT1 of FIG. 2 as a supervisory signal to the position trunk circuit PTC1 of FIG. 2 that position OP1 is available for service. Relay PA1 operates via contacts TH–1, TFA–1, MB–1, PR–2, TNE–2 and PO–2 to ground. The operation of relay PA1 reverses the polarity on trunk PT1 of FIG. 2 by opening contact PA1–1 and PA1–2 and subsequently connecting conductor T1 via contact PA1–3 and an upper winding of line relay L1 to ground and the conductor R1 via contact PA1–4 and a lower winding of relay L1 to a negative potential. Trunk circuit PTC1 is thereafter operative for signaling the telephone switching network SN in a conventional manner that it is available for receiving calls on primary trunk PT1.

INCOMING CALL ON PRIMARY TRUNK

Primary trunk PT1 of FIG. 2 is engaged on an incoming call after network SN operates the position trunk circuit PCT1 to apply a conventional low resistance bridge across the tip and ring conductors T1 and R1. As a result, line relay L1 of FIG. 2 operates over the path from ground through its upper winding, contact PA1–3, conductor T1, the bridge in position trunk circuit PCT1, conductor R1, contact PA1–4 and a lower winding of relay L1 to negative potential. In operating, relay L1 activates the trunk hold relay TH1 of FIG. 2 over the path via contact L1–1 to ground. The operation of relay TH1, in turn, opens its contact TH1–1 for releasing relay PA1 to reverse the potentials on the conductors T1 and R1 as a signal to the trunk circuit PTC1 to extend a talking connection to trunk PT1. Upon operating, relay TH1 also operates relay TN of FIG. 4 for connecting a zip tone signal to position OP1 for alerting the attending operator to the incoming call. Relay TN operates in the path via contacts TNE–3, TK2–1, TFA–2 and TH1–2 to ground. In operating, relay TN locks to ground via contacts TN–2, CT–1, PR–1 and PO–1. Operated relay TN also activates a cut-through auxiliary relay CTA of FIG. 4 to light a primary trunk lamp TRK1L of FIG. 7 at position OP1 for providing a visual call alerting signal to the operator. Relay CTA is activated via contact CT–2, and TN–3 to ground. The operation of relay CTA energizes lamp TRK1L over the path from negative potential through lamp TRK1L and contact TF1–1, CTA–1 and PO–3 to ground.

When relay TN operates, it connects audible zip tone to position OP1 via conductors T and R, contacts CT–3, CT–4, MBA–1 and MBA–2, the windings of transformer TTN and contacts TNE–4 and TN–4 from zip tone source ZTS. The tone remains thus connected for a time interval which is determined by the slow release of relay TNE under control of relay TN. Upon operating, relay TN opens at its contact TN–1 the operating circuit for relay TNE which then slowly releases due to its secondary winding being shunted by contact TNE–1. The release of relay TNE disconnects the zip tone from the path to position OP1 at contact TNE–4.

Figure 4:
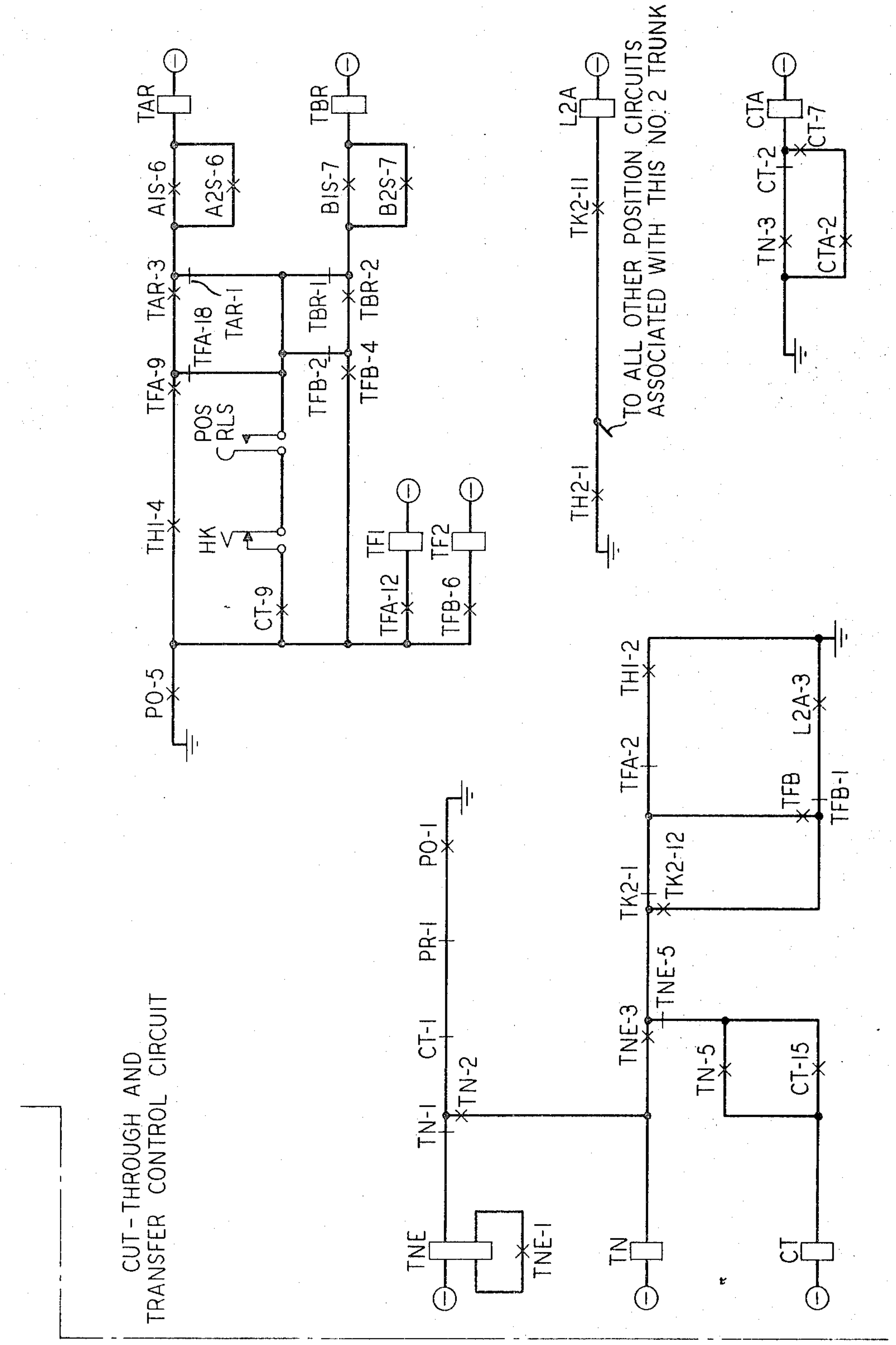

The release of relay TNE causes the operation of relay CT of FIG. 4 for cutting through the talking connection from trunk PT1 to position OP1. Relay CT operates via contacts TN–5, TNE–5, TK2–1. TFA–2 and TH1–2 to ground. Upon operating, relay CT locks via its contact CT–5 which bridges the operate path contact TN–5. In addition, relay CT completes a locking path for relay CTA of FIG. 4 via contacts CT–7 and CTA–2 to ground. Operated relay CT also opens its contact CT–1 to effect the release of relay TN. The talking paths between caller and position OP1 are cut through from the conductors T1 and R1 via contacts PA1–1, PA1–2, HD1–1, HD1–2, TFA–3, TFA–4, capacitors TC and RC, conductors T and R, and contacts CT–5, CT–6 to position OP1. The operator may then communicate with the caller and proceed to serve the call.

POSITION RELEASE

At the end of the call on trunk PT1, the calling customer disconnects and the position trunk circuit applies a conventional high resistance bridge across conductors T1 and R1 for effecting the release of relay L1. In releasing, relay L1 opens its contact L1–1 for effecting the slow release of relay TH1 of FIG. 2. Relay TH1 is made slow release in order to preclude the premature release of the position OP1 due to transients on trunk PT1. After the relay TH1 releases, relay CT of FIG. 4 is released by the opening of contact TH1–2. In releasing, relay CT opens its contact CT–7 for effecting the release of relay CTA which in turn extinguishes the lamp TRK1L of FIG. 7 by opening its contact CTA–1.

When relay CT releases, it initiates a series of operations for preparing the position control circuit PCC1 for serving a new call. In particular, the release of relay CT causes the reoperation of relay TNE of FIG. 4 over the priorly described path through contact TN–1, CT–1, PR–1 and PO–1 to ground. The operation of relay TNE, in turn, causes the operation of relay PA1 for reversing the potentials on the conductors T1 and R1 of trunk PT1 as a signal to trunk circuit PCT1 that position OP1 is prepared to serve a new call. Relay PA1 operates as priorly described over the path through contact TH1–1, TFA–1, MB–1, PR–2, PNE–2 and PO–2 to ground. The reversal of the potentials on conductors T1 and R1 is effected by the transfer contacts PA1–1 through PA1–4.

POSITION OP1 REQUEST FOR CONNECTION TO SUPERVISOR POSITION SP

Each position has access to a centralized supervisor console, or position, SP via two trunks. For example, position OP1 has access to position SP of FIG. 3 via the trunks ST1 and ST2 of FIG. 2. Each of the latter trunks is shared by a plurality of other operator positions inasmuch as calls from operator positions to the supervisor are made relatively infrequently and are of short duration. Illustratively, trunk ST1 is shared by a first group of operator positions and is preferred when calls are to be switched from position OP1 to position SP. The trunk ST2, on the other hand, is shared by a greater plurality of operator positions in a second group and is used as an overflow, or secondary, trunk for switching calls from position OP1 to position SP when the trunk ST1 is occupied or busy serving another call. An operator at position OP1 is informed of the status of the trunks ST1 and ST2 by means of a lamp SRL of FIG. 5. If both of the trunks ST1 and ST2 are busy, lamp SRL is lighted to inform the operator that she must wait until the lamp is extinguished before attempting to call the supervisor.

Figure 7:
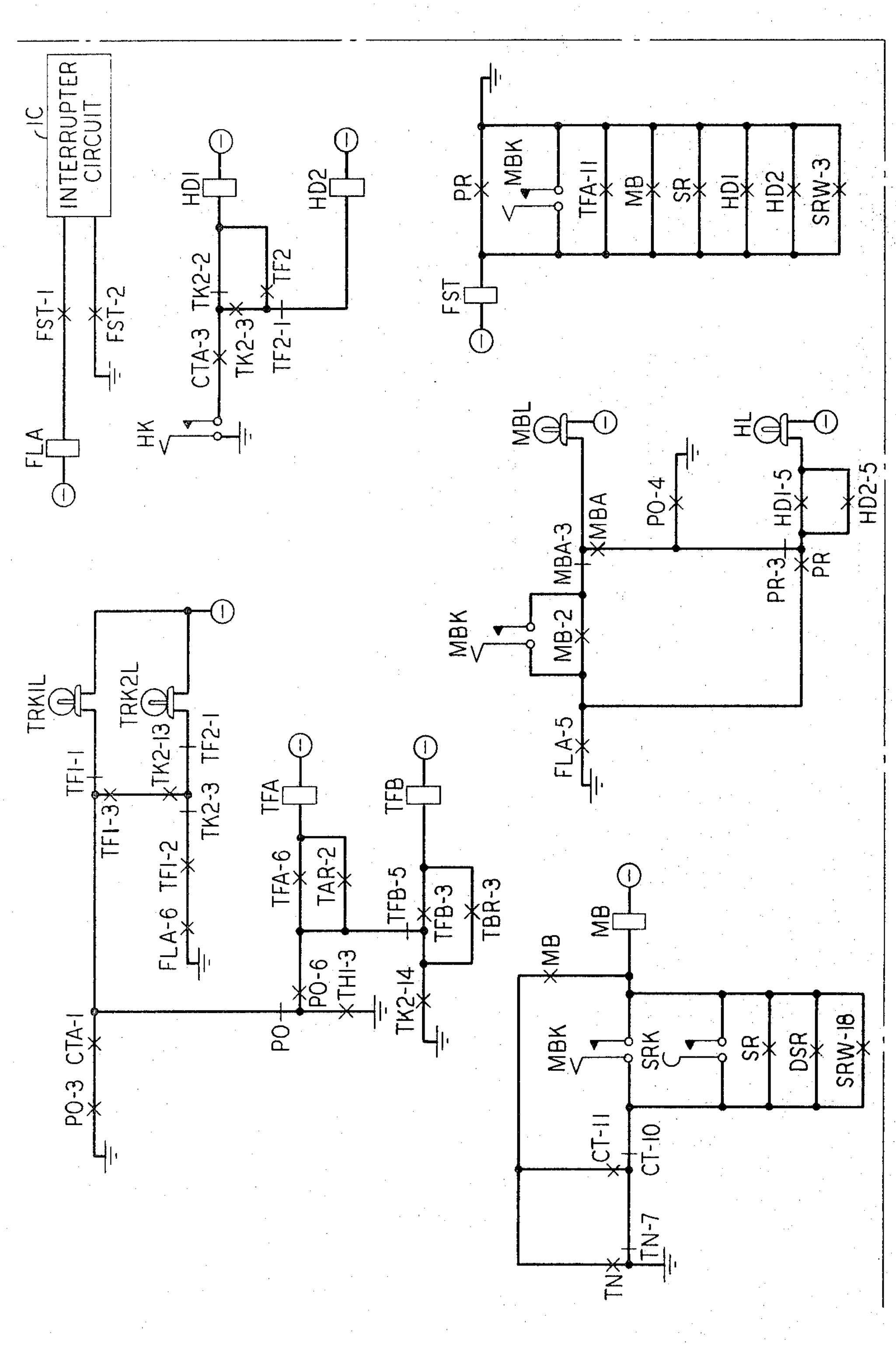

When an operator at position OP1 is serving a call at the time it is desired to place a call to supervisor position SP, the operator places a hold condition on the incoming one of the trunks serving such call, that is, trunk PT1 or PT2. The hold condition consists of placing a transmission termination across the trunk tip and ring conductors such as by connecting the capacitor and resistor network HD1C and HD1R across the PT1 trunk conductors T1 and R1 via the contacts HD1–3 and HD1–4 and by opening, or splitting, the tip and ring path to position OP1 at the contacts HD1–1 and HD1–2 for enabling the operator to converse to the supervisor position SP in privacy. The hold condition is placed on trunk PT1 when key HK of FIG. 1 is actuated and for operating relay HD1 over the path via contacts TK2–2 and CTA–3 and key HK to ground. Similarly, a hold condition is placed on the secondary trunk PT2 of FIG. 2 in essentially the same manner by the termination network of resistor HD2R and capacitor HD2C being connected across conductors T2 and R2 via contacts HD2–3 and HD2–4. The transmission over conductors T2 and R2 toward position OP1 is split at contacts HD2–1 and HD2–2. Relay HD2 of FIG. 7 is operated on calls involving the secondary trunk PT2 over a path through contacts TF2–1, TK2–3, CTA–3 and key HK to ground. Upon operating, relay HD1 or HD2 energizes lamp HL of FIG. 7 for informing the operator that the hold condition is effective. Lamp HL is energized over the path through contact HD1–5 or HD2–5, PR–3 and PO–4 to ground.

The operator at position OP1 subsequently initiates a request for a connection to the supervisor position SP by momentarily depressing the SRK of FIG. 7. The operation of key SRK initiates a series of relay operations which are essentially the same for both trunks PT1 and PT2 and which causes the selection of one of the two supervisor trunks ST1 or ST2. The activation of key SRK causes the operation of relay SRW of FIG. 5. Relay SRW operates over a path in FIG. 5 from negative potential through the resistor SRWR, the SRW relay winding and the contacts SR–1, TFA–5, CR1–1, SRW–1, SR–2, CT–8, key SRK, and diode SRD to a ground supplied to conductor TG by a supervisor trunk selection and distribution circuit STD of FIG. 5. In operating, relay SRW locks via contacts SR–1, TFA–5, SR1–1 and SRW–2 to ground. It is noted at this point that relay SRZ is not operated because ground is applied to both sides of its winding via contacts SRW–2 and SRZ–1 of FIG. 5. Relays SRZ and SRW form a WZ circuit which is activated upon the closure of key SRK to initiate a series of circuit operations which result in the requesting of a connection over one of the trunks ST1 or ST2 to supervisor position SP. The SRA key is also effected to control the SRZ, SRW relays to effect flashing of the SR lamp upon the release of key SRK to indicate to the operator at position OP1 that the circuit action has progressed to the point of requesting the connecion of the supervision position SP to position OP1.

The operation of relay SRW causes the operation of relay T1S for effecting a bid for trunk ST1 through the supervisor trunk and distribution circuit STD to the position ST. Relay T1S is operated over a path extending from battery supplied by circuit STD via conductor TT1, the T1S relay winding and the contacts B1S–1, A1S–1, SRZ–17, SRW–4, SR1–3, SR–3 and PO–4 to ground.

The ground on conductor TG from circuit STD is applied only when one of the two supervisor trunks ST1 and ST2 is available for serving calls. During the time that the key SRK is activated, this ground may be removed due to the selection of one of the trunks ST1 and ST2 for serving a call from another one of the operator positions sharing these trunks to the supervisor SP. As a result, upon the operation of relay SRW a supplementary holding ground is provided to conductor TG under control of relay SRW via the contacts SRW–5 and SR–13. The ground thus supplied precludes SRZ from being operated prematurely, that is, prior to the release of key SRK.

Figure 5:
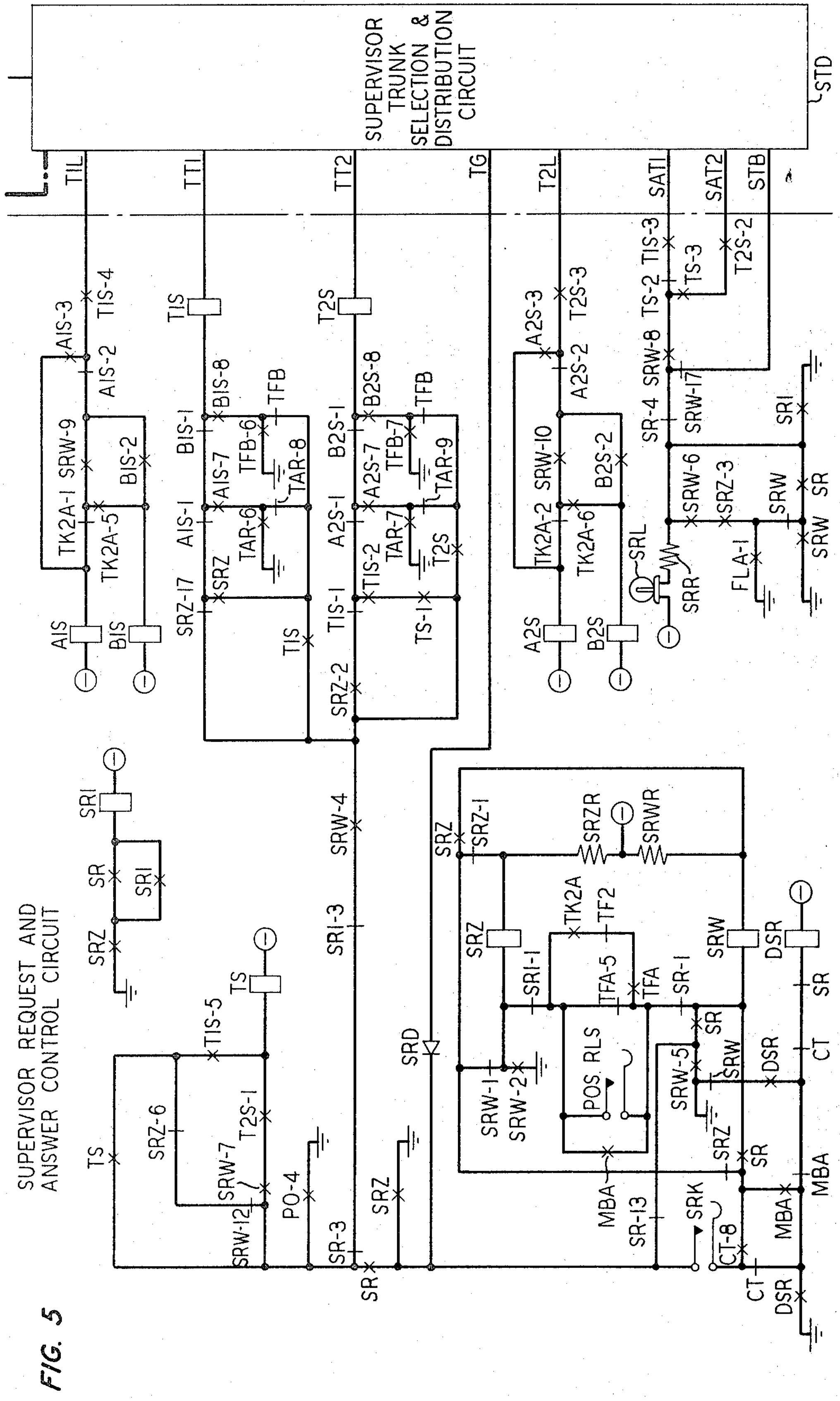

If trunk ST1 is unavailable for serving the position OP1 request for connection to position SP and trunk ST2 is available, the relay T2S of FIG. 5 is operated for enabling that trunk to be selected by circuit STD for serving position OP1. Before relay T2S operates, however, relay SRZ is operated under control of the release of key SRK of FIG. 5 as later described. Relay T2S operates over the path from negative potential in circuit STD through the T2S relay winding and contacts B2S–1, A2S–1, T1S–1 and SRZ–2 or T1S–2 and TS–1, SRW–4, SR1–3, SR–3 and PO–4 to ground. The contacts T1S–2 and TS–1 are closed in the latter path when trunk ST1 is in use with a prior call transfer from position OP1 to position SP and relays T1S and TS are operated as later described. The supervisor trunk selection and distribution circuit STD thereafter is operated for assigning the trunk ST2 for serving the call from position OP1 and making it unavailable for serving calls from other positions in the same group.

When the operator releases key SRK, relay SRZ is operated over the path from negative potential through resistor SRZR, the SRZ relay winding and contact SRW–2. Thus, the shunting ground around the SRZ relay winding via contact SRZ–1 is removed by the opening of key SRK. In operating, relay SRZ causes lamp SRL of FIG. 5 to flash in an interrupted rate under control of FLA of FIG. 7 and in the circuit path from negative potential through SRL lamp, resistor SRR and contacts SRW–6, SRZ–3, and FLA–1 to ground. If the supervisor trunk ST1 is connected to another operator position at the time that relay SRZ operates, relay T2S operates as previously explained by the closure of contact SRZ–2 which in combination with contact T1S–1 parallels contacts T1S–2 and TS–1 in a priorly traced operated path for relay T2S.

The operation of relay T2S causes the trunk-to-supervisor relay TS of FIG. 5 to be operated via a path through contacts T2S–1, SRW–7 and PO–4 to ground. In operating, relay TS transfers control over the flashing of the lamp SRL of FIG. 5 from conductor SAT1 to conductor SAT2 from the circuit STD for the purpose of enabling the lamp to be operated at a steady rate to indicate that both trunks ST1 and ST2 are busy when the supervisor answers the request from position OP1. Advantageously, each of other operator position control circuits in the group sharing trunks ST1 and ST2 is equipped with an SRL lamp which is controlled in the same manner as lamp SRL of FIG. 7 for indicating its busy-idle status of trunks ST1–ST2.

After either relay T1S or T2S is operated, as priorly described, a signal is sent from circuit STD over the trunk STA for alerting the supervisor to the calling request. In addition, if both of the trunks ST1 and ST2 are now engaged for serving calls to a supervisor console, circuit STD applies the ground to conductor STB for energizing the lamp SRL in all other position control circuits associated with positions sharing trunks ST1 and ST2 for providing an indication to the operators at such positions that both of the trunks to the supervisor are busy.

SUPERVISOR ANSWERS CALL

After the supervisor at position SP answers the call, a signal is sent over trunk STA from circuit STD for causing lamp SRL of FIG. 5 to operate at a steady rate. The steady state lighting is effected over the path from negative potential through lamp SRL, resistor SRR and the contacts SR–4 and SRW–8 to steady state ground on lead SAT1 via contacts TS–2 and T1S–3 or on lead SAT2 via contacts TS–3 and T2S–2. When trunk ST1 is selected by the selection and distribution circuit STD for extending the call on trunk PT1 from position OP1 to position SP, relay A1S is operated over the path through contacts TK2A–1, SRW–9, A1S–2, and T1S–4 to ground supplied from the circuit STD via lead T1L. In operating, relay A1S locks via its contact A1S–3 and contact T1S–4 to the ground on lead T1L. The operation of relay A1S connects position OP1 to position SP over a path including conductors T and R, contacts CT–5 and CT–6, capacitors TC and RC, contacts TFA–3, TFA–4, A1S–4 and A1S–5 and conductors TA and RA through circuit STD and trunk STA.

Similarly, when trunk ST1 is selected by circuit STD for extending a call on trunk PT2 from position OP1 to position SP, relay B1S of FIG. 5 is operated instead of relay A1S specifically under control of relay TK2A which as later described is uniquely operated when position OP1 is serving a call on trunk PT2. Relay B1S is operated over a path through contacts TK2A–5, SRW–9, A1S–2 and T1S–4 to ground supplied from circuit STD via lead T1L. In operating, relay B1S locks via contacts B1S–2, A1S–2 and T1S–4 to ground on lead T1L. The operation of relay B1S connects position OP1 to position SP over a path including conductors T and R, contacts CT–5 and CT–6, capacitors TC and RC, contacts TFA–7, TFA–8, B1S–3 and B1S–4, and the conductors TA and RA through circuit STD and trunk STA.

On the other hand, when the supervisor trunk ST2 is selected by the distribution circuit STD for serving a call on trunk PT1 from position OP1, relay A2S of FIG. 7 is operated over a path through contacts TK2A–2, SRW–10, A2S–2, and T2S–3 to a ground on lead T2L from the distribution circuit STD. In operating, relay A2S locks via its contact A2S–3 and contact T2S–3 to the ground on lead T2L. Operated relay A2S extends the operator position OP1 over the trunk ST2 to the operator position SP over a path from the T and R conductors, contacts CT–5 and CT–6, capacitors TC and RC and the contacts TFA–3, TFA–4, A2S–4 and A2S–5 and conductors TB and RB of trunk ST2 through the distribution circuit STD and trunk STA to position SP.

When trunk ST2 is selected by circuit STD for extending a call on trunk PT2 from position OP1 to position SP, relay B2S of FIG. 5 is operated instead of relay A2S and under control of relay TK2A–6 which operates when position OP1 is serving a call on trunk PT2. Relay B2S is operated over a path through contacts TK2A–6, SRW–10, A2S–2 and T2S–3 to ground on lead T2L. In operating relay B2S locks via contacts B2S–2, A2S–2 and T2S–3 to ground on lead T2L. The operation of relay B2S connects position OP1 to position SP via a path including conductors T and R, contacts CT–5 and CT–6, capacitors TC and RC, contacts TFA–7, TFA–8, B2S–3 and B2S–4, and the conductors TB and RB through circuit STD and trunk STA. The operator and the supervisor are now in a talking condition with the calling customer on trunk PT1 or PT2 excluded from the connection by the prior activation of relay contacts HD1–1 and HD1–2.

TRANSFER OF CALL ON TRUNK PT1 TO SUPERVISOR POSITION SP

During the conversation between the operator at position OP1 and the supervisor, it occasionally is desirable that an operator transfer the call to the supervisor for service. If the call on trunk PT1 had priorly been excluded from the connection toward supervisor position SP, the operator at position OP1 releases key HK of FIG. 7 before a transfer of the call is made to position SP. In releasing, key HK opens the operated path for relay HD1 which then releases and removes the transmission termination resistor HD1R and capacitor HD1C from across the conductors T1 and R1 of FIG. 2 and transfers, or connects, trunk PT1 through contacts HD1–1 and HD1–2 to a joint connection between the position OP1 and the operator position SP via trunk ST1 or ST2.

An operator subsequently transfers supervision over a call from her position by momentarily depressing the position release key POS RLS of FIG. 4. The operation of key POS RLS causes the operation of a trunk release relay TAR of FIG. 4 over a path via the operated one of the contacts A1S–6 or A2S–6, contacts TAR–1, key POS RLS, key HK, and contacts CT–9 to PO–5 to ground. In operating, relay TAR causes the operation of a trunk release auxiliary relay TFA of FIG. 7 via contacts TAR–2, PO–6 and TH1–3 to ground. Relay TFA then locks via its contact TFA–6 and contacts PO–6 and TH1–3 to ground.

In operating, relay TFA transfers the T and R conductors of the operator trunk OT together with the operator telephone facilities of position OP1 from the trunk PT1 to trunk PT2 of FIG. 2 by the operation of contacts TFA–7 and TFA–8. Relay TFA also provides an auxiliary holding path for relay TAR of FIG. 4 via contacts A1S–6 or A2S–6 and the contacts TAR–3, TFA–9, TH1–4 and PO–5 to ground. Thus, relays TAR and TFA operations are thereafter controlled independently of the position release key POS RLS.

In FIG. 3, the operation of relay TFA provides an auxiliary holding path for relay PO via contacts TFA–10 and PO–7, to ground to prevent relay PO from releasing in the event that the operator at position OP1 should inadvertently remove her telephone set at this point. Relay TFA in operating also provides an auxiliary holding path for relay FST of FIG. 7 via contact TFA–11 to ensure that the flashing relay FLA is maintained operating at an interrupted rate under control of interrupter IC after relay SRW of FIG. 5 is released as later described.

The operation of relay TFA also opens the operate paths for relay CT of FIG. 4 to effect its release under control of contact TFA–2. In releasing, relay CT causes the release of relay CTA of FIG. 4 by opening its contact CT–7. Released relay CT also causes the operation of relay TNE to prepare for the timing of zip tone to an operator on a subsequent call. Relay TNE operates over the priorly described path through contacts TN–1, CT–1, PR–1 and PO–1 to ground. The release of relay CT also opens the tip and ring path between the operator position OP1 and the trunks PT1 and PT2 at contacts CT–5 and CT–6 of FIG. 3.

The release of relay CT also effects the operation of relay MB of FIG. 7 over a path through contacts SRW–18, CT–10 and TN–7. In operating, relay MB causes the make busy lamp MBL to be energized at a flashing rate under control of the relay FLA of FIG. 7. Lamp MBL is energized over the path through contacts MBA–3, MB–2, FLA–5 to ground. The flashing lamp indicates to the operator at position OP1 that the call has been transferred to position SP.

When relay TFA operated as priorly described, it caused the operation of relay TF1 of FIG. 4 over the obvious path of the contacts TFA–12 and PO–5 to ground. In operating, relay TF1 causes trunk lamp TRK1L of FIG. 7 to be extinguished by opening the priorly described energizing path through contact TF1–1 as a signal to the operator that the call on trunk PT1 has been transferred to the supervisor position SP. In addition, the operation of relay TF1 causes the trunk lamp TRK2L of FIG. 7 to be energized as a signal to the operator that calls are to be incoming on the trunk PT2 for service at her position. Lamp TRK2L is energized over a path through contacts TF2–1, TK2–3, TF1–2 and FLA–6 to ground.

During the time that the foregoing actions are in progress to transfer a call from position OP1 to the supervisor position SP, the SRW relay of FIG. 5 is maintained in an operated condition. When relay CT releases as priorly described, the original operate path for relay SRW is opened at contact CT–8, but relay SRW is held operated over an auxiliary path extending through contact SR–1, a contact of the position release key POS RLS and contacts SR1–1 and SRW–2 to ground.

After the operator has received the TRK1L, TRK2L and MBL lamp indications, she releases the key POS RLS for causing a series of circuit operations that prepare her position for serving other calls over the position trunk PT2. The release of the position release key causes relay SRW of FIG. 5 to be released by opening the auxiliary holding path through the POS RLS key contacts. The release action of relay SRW causes the extinguishing of lamp SRL of FIG. 5 by opening contact SRW–8 provided that only one of the two trunks ST1 or ST2 to the supervisor position is busy. When relay SRW releases, it also opens its contact SRW–18 to effect the release of relay MB of FIG. 7. The release of relay MB extinguishes the lamp MBL by opening contact MB–2 of FIG. 7. In releasing, relay SRW opens its contact SRW–2 to effect the release of relay SRZ of FIG. 5. The release of relay SRZ operates relay TS of FIG. 5 which prepares the position control circuit PCC1 for calling the supervisor position SP if it is necessary to do so while the supervisor trunk ST1 is in the transfer mode. Relay TS is operated over the path through contacts ST1–5, SRZ–6, SRW–12 and contact PO–4 to ground.

SHARED SECONDARY TRUNK PT2 CONNECTED TO OPERATOR POSITION OP1

In accordance with our invention, after a call on a primary operator trunk has been transferred to a supervisor position, the transferring operator advantageously is automatically made available for serving calls on the secondary trunk PT2. A feature of the illustrative embodiment of our invention is that the secondary trunk is shared by a plurality of operator positions, but is only connectable to one such position at a time. To ensure that only one position is connected to the shared trunk PT2, the illustrative embodiment provides preference and lock-out relays TK2 in each of the operator position control circuits such as circuit PCC1. Contacts of all the relays TK2 in a group of operator position control circuits sharing trunk PT2 are arranged in a preference chain arrangement PRC of FIG. 6 which is common to all TK2 relays and which enables only one of the TK2 relays to operate at a time. The preference chain of relay TK2 contacts serves to provide operating negative potential selectively to the windings of relays TK2.

Figure 6:
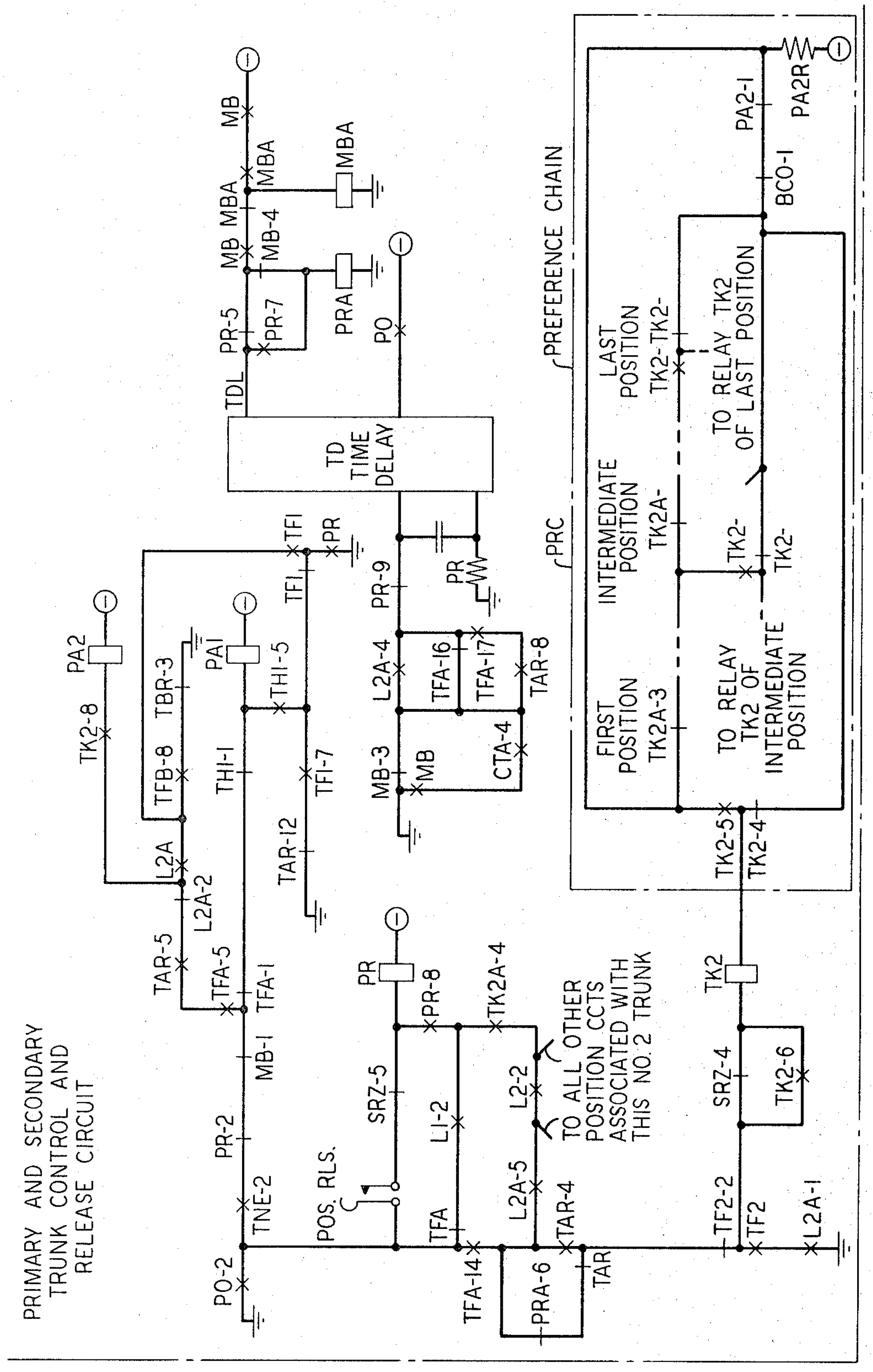

Illustratively, the TK2 relay of FIG. 6 associated with operator position OP1 is operable when the shared trunk PT2 is idle and when none of the other TK2 relays associated with other operator positions in the sharing group is operated. If trunk PT2 is busy when relay SRZ of FIG. 5 releases, as previously described, and following the transfer of a call to the supervisor position SP, the preference chain PRC of FIG. 6 is opened to block the operation of relay TK2 of FIG. 6 until after the trunk PT2 becomes idle. The operator at position OP1 is informed of the unavailability of the shared trunk PT2 by the continual flashing of lamp TRK2L of FIG. 7 under control of relay FLA as previously described.

When trunk PT2 is idle and available for connection to position OP1 following the transfer of a call on trunk PT1 to the supervisor position SP, relay TK2 of FIG. 6 operates in a path from one end of its winding through preference chain PRC contacts TK2–4, BCO–1 and PA2–1, and resistor PA2R to negative potential. The remainder of the operating path is from the other winding end of relay TK2 through contacts SRZ–4, TF2–2, TAR–4, TFA–14 and PO–2 to ground. Upon operating, relay TK2 locks via its contact TK2–5 and resistor PA2R to ground and contact TK2–6 which bridges contact SRZ–4. In operating, relay TK2 extinguishes lamp TRK2L of FIG. 7 by opening its contact TK2–3 thereby informing the operator at position OP1 that calls are to be switched to her position over the shared trunk PT2.

The operation of relay TK2 causes the operation of relay TK2A of FIG. 3 via contacts TFB–4, TK2–7 and PO–8 to ground. In operating, relay TK2A operates the battery cut-off relay BCO of FIG. 3 via contacts TK2A–8 and PO–8 to ground for opening contact BCO–1 in preference chain PRC of FIG. 6 to remove operating battery from the priorly described operate paths for the TK2 relays associated with other positions in the group sharing trunk PT2.

In operating, relay TK2 in turn operates relay PA2 of FIG. 6 for reversing the voltage polarities on the tip and ring conductors T2 and R2 of trunk PT2 of FIG. 2 toward the telephone switching network SN as a signal that an operator is available for serving calls thereon. Relay PA2 operates via contacts TK2–8, L2A–2, TAR–5, TFA–5, MB–1, PR–2, TNE–2 and PO–2 to ground. The polarity reversal on the PT2 trunk conductors T2 and R2 is controlled by transfer contacts PA2–1 to PA2–4 in series with the windings of relay L2 of FIG. 6. In addition, relay TK2 closes its contacts TK2–9 and TK2–10 for extending the trunk PT2 to conductors T and R toward the operator position OP1. The latter position is then available for receiving and serving calls from the switching network via the shared trunk PT2.

INCOMING CALL ON SECONDARY TRUNK PT2

Secondary trunk PT2 is engaged on a call when the switching network SN of FIG. 2 activates the position trunk circuit PCT2 to apply a low resistance bridge (not shown) across tip and ring conductors T2 and R2. As a result, the line relay L2 of FIG. 2 is operated over a path from ground through the upper winding of relay L2, contact PA2–3, conductor T2, the bridge in position trunk circuit PCT2, conductor R2, contact PA2–4 and a lower winding of relay L2 to battery. In operating, relay L2 activates a trunk hold relay TH2 of FIG. 2 via contact L2–1 to ground. Activated relay TH2 in turn operates relay L2A of FIG. 4 via contacts TK2–11 and TH2–1 to ground. The operation of L2A opens its contact L2A–2 for releasing relay PA2 and thereby to reverse via contacts PA2–1 to PA2–4 the potentials on the conductors P2 and R2 as a signal to the trunk circuit PCT2 to extend a talking connection to the trunk PT2. Upon operating, relay L2A also operates relay TN of FIG. 4 for connecting a zip tone signal to the operator position OP1 for alerting the operator to the incoming call. Relay TN operates via contacts TNE–3, TK2–12, TFB–1 and L2A–3 to ground. In operating, relay TN locks to ground via contacts TN–2, CT–1, PR–1 and PO–1 to ground. Operated relay TN also operates a cut-through auxiliary relay CTA of FIG. 4 via contacts CT–2 and TN–3 to ground for lighting a lamp TRK2L and thereby providing a visual call alerting signal to the operator at position OP1. Lamp TRK2L is energized via contact TF2–1, TK2–13, TF1–3, CTA–1 and PO–3 to ground.

The audible zip tone signal is transmitted to position OP1 over conductors T and R, contacts CT–3, CT–4, MBA–1 and MBA–2 windings of transformer TTN and contacts TNE–4 and TN–4 from source TS. Tone remains thus connected for a time interval which is determined by the slow release of relay TNE under control of relay TN. When relay TN operates as previously described, it opens at its contact TN–1 the operating circuit of TNE which then releases slowly due to its secondary winding being shorted via contact TNE–1. The release of relay TNE disconnects the zip tone from the path to the operator position OP1 at contact TNE–4.

The release of relay TNE causes the operation of relay CT of FIG. 4 for cutting through the talking connection from trunk PT2 to position OP1. Relay CT operates via contacts TN–5, TNE–5, TK2–12, TFB–1 and LA2–3 to ground. In operating, relay CT locks via its contact CT–5 which bridges the operating path contact TN–5. Operated relay CT also opens its contact CT–1 to effect the release of relay TN. A talking path between the caller and position OP1 is now cut through from conductors T and R via contacts CT–5 and CT–6, capacitors TC and RC and contacts TFA–7, TFA–8, HD2–1, HD2–2, TK2–9, TK2–10, PA2–1, PA2–2 to conductors T2 and R2 respectively. The operator may then communicate with the caller and proceed to complete the functions needed for serving the call.

RELEASE OF CALL ON SECONDARY TRUNK PT2—CALLER DISCONNECTS FIRST

It is a customary practice for an operator to remain connected to a call serving a customer in all cases except those for example where an operator determines that a caller inadvertently failed to hang up following the completion of a call. When a caller disconnects from a call on secondary trunk PT2, the trunk circuit PCT2 is activated to apply a high resistance disconnect signal to trunk PT2 for effecting the release of relay L2. In releasing, relay L2 opens contact L2–1 to deactivate relay TH2 which in turn releases relay L2A of FIG. 4.

If the primary trunk PT1 either has become idle or is yet connected to supervisor position SP at the time relay L2A releases, relay CT of FIG. 4 is deactivated by opening contact L2A–3. Thereafer, relay CTA of FIG. 4 releases upon the opening of contacts CT–7 and relay TNE of FIG. 5 reoperates over the priorly described path. The release of relay CTA deenergizes lamp TRK2L by opening contact CTA–1 to notify the operator at position OP1 of the call completion. If the primary trunk PT1 thereafter remains connected to supervisor position SP, the operation of relay TNE causes relay PA2 to be operated for sending under the control of contacts PA2–1 to PA2–4 a polarity reversal signal over trunk PT2 as an indication to network SN that an operator position is available for serving another call over trunk PT2.

When the primary trunk PT1 is idle, as hereinafter explained, at the time relay L2A is released, a timer TD of FIG. 6 is activated by the opening of contact LA2–4 to initiate a predetermined guard time interval. This interval provides for a delayed position release which guards against a premature cutoff of a call that may be in the process of being subsequently connected through the network SN and trunk circuit PCT2 to position OP1 over trunk PT2 following the making of that trunk available for receiving another call and before the complete release of the position control circuit PCC1. At the end of the timing interval, relay PRA of FIG. 6 is operated over a path from ground through its winding, contacts MB–4 and PR–5 to the negative potential supplied by timer TD on lead TDL. In operating, relay PRA opens its contact PRA6 to release relay TK2 of FIG. 6. It is noted that contact TAR–1 which parallels contact PRA–4 is opened at this time due to the circuit actions which return trunk PT1 to its idled state as hereinafter explained. The release of relay TK2 in turn releases relay TK2A and TFA by opening contacts TK2–7 and TK2–14. When relay TK2A releases, it effects the release of relay BCO which in turn closes its contact BCO–1 in the preference chain PRC of FIG. 6. Thereafter, another less preferred operator position than position OP1 in the group sharing trunk PT2 is enabled to obtain preference through the preference chain PRC for engaging trunk PT2 to serve calls on an overlap basis. At about the same time, the release of relay TFA actuates its transfer contact TFA–3, TFA–4, TFA–7 and TFA–8 to disconnect the secondary trunk PT2 from the operator trunk PT and connect the latter trunk again toward primary trunk PT1. The release of relay TFA also effects the release of relays TF1 and FST by opening contacts TFA–12 and TFA–11. Relay FST in releasing opens the operate path for relay FLA at contacts FST–1 and FST–2 to preclude flashing operations of lamp TRK2L. The release of relay TFA effects the operation of relay PA1 for sending a polarity reversal over trunk PT1 as previously described to indicate that operator position OP1 is available for serving another call on trunk PT1.

OPERATOR POSITION RELEASE FROM SECONDARY TRUNK PT2

An operator at position OP1 effects the release of a call over trunk PT2 by momentarily activating the position release key POS RLS which in turn operates relay PR of FIG. 6 over a path through contacts SRZ–5, key POS RLS and contact PO–2 to ground. In operating, relay PR locks via contacts PR–8, TK2A–4, L2–2, L2A–5, TFA–14 and PO–2 to ground. The operation of relay PR connects relay PRA of FIG. 6 to lead TDL of timer TD via contact PR–7 and concurrently opens contact PR–9 for activating timer TD to initiate a time delay relese of position OP1. The timed delay is utilized to enable the position control circuit PCC1 to recycle its circuitry associated with trunk PT2.

The operation of relay PR in turn operates relay PA2 to send a polarity reversal over the tip and ring conductors of trunk PT2 as a position disconnect signal which effects the release of trunk circuit PTC2 and call connections through network SN. Thereafter, circuit PCT2 applies a high resistance bridge across trunk PT2 for causing the release of relay L2. The release of relay L2 opens both the operate path for the slow release relay TH2 and the locking path for relay PR. Accordingly, if the position release key POS RLS is priorly deactivated, relay PR releases. The release of relay PR recloses its contact PR–9 to deactivate timer TD for canceling its timing function. In addition, upon the release of relay PR or the subsequently described release of relay L2A, relay PA2 is deactivated by opening its already described operating path under control of the PR or L2A relay contacts. Released relay PA2 in turn activates its contacts PA2–1 to PA2–4 for sending a polarity reversal over trunk PT2 to indicate that the position is unavailable for serving calls.

Relay TH2 releases after a delay interval and then effects the release of relay L2A of FIG. 4 by opening its contact TH2–1. Upon releasing, relay L2A opens contact L2A–4 to activate timer TD for initiating a timing interval which guards against the condition in which the customer disconnects after the operator position has effected a release and the customer disconnect causes another call to be connected to trunk PT2 immediately as it becomes available. The guard interval precludes the caller from being undesirably cut off by a release of trunk PT2. The release of relay L2A also opens contact L2A–3 to effect the release of relay CT of FIG. 4 which in turn releases relay CTA of FIG. 4 by opening contact CT–7. The combined release of relays CT and PR as priorly explained causes the operation of relay TNE of FIG. 4 which controls the zip tone transmission interval as already described. Afterwards, the primary trunk PT1 is yet connected to the supervisor position SP, the operation of relay TNE causes the reoperation of relay PA2 to reverse the tip and ring polarities on trunk PT2 as a signal that the operator position is prepared for serving another call thereon.

The guard interval is utilized to guard against the undesired cut off of a caller on trunk PT2 when trunk PT1 subsequently becomes idle and available for serving a call. The guard enables the position control circuit to switch the operator telephone equipment to position OP1 when it becomes idle and after an operator serves a call on trunk PT2 without prematurely releasing a call connection which network SN switches onto trunk PT2. When a new call is received on trunk PT2 during the guard interval, relays L2, TH2 and L2A are operated as previously described with the result that the operation of relay L2A recycles the timer TD by reclosing contact L2A–4.

In contrast, if the primary trunk PT1 is idle when relay TNE operated, certain circuit operations including the release of relays TFA and TK2 occur as described hereinbefore when the caller disconnects first and as a result relay PA2 is precluded from operating by the opening of contact TK2–8. Consequently, when relay TNE operates, relay PA1 instead of relay PA2 is operated over its priorly described path for reversing the tip and ring polarity on trunk PT1 as a signal that the position is available for serving another call thereon.

CALL ON SECONDARY TRUNK PT2 TRANSFERRED FROM POSITION OP1 TO SUPERVISOR POSITION SP

The manner in which an operator at position OP1 requests a connection to supervisor position SP for supervisor assistance and selectively transferring a call over trunk ST1 or ST2 to the supervisor is described hereinbefore. Accordingly, the following explanation is directed only to these aspects of circuit PCC1 concerned with the transfer and supervision of connections from trunk PT2 to supervisor trunk STA. As priorly explained, a call transfer from position OP1 to position SP is initiated by the operation of a position release key POS RLS of FIG. 4. The operation of the key causes the activation of relay TBR over a path including the operated one of the contacts B1S–7 or B2S–7, contact TBR–1, key POS RLS, key HK, and the contacts CT–9 and PO–5 to ground. In operating, relay TBR locks via contacts TBR–2 and TFB–2 which bridge the operating path contact TBR–1. The operation of relay TBR also causes the operation of relay TFB of FIG. 7 via contacts TBR–3 and TK2–14 to ground. Relay TFB then locks via contacts TFB–3 and TK2–14. In addition, the operation of relay TFB closes an auxiliary locking path for relay TBR independent of key POS RLS and via contacts B1S–7 or B2S–7, TBR–2, TFB–4 and PO–5 to ground.

Operated relay TFB also causes the release of relay CT of FIG. 4 by opening contact TFB–1. In releasing, relay CT causes the release of relay CTA of FIG. 4 by opening contact CT–7. Released relay CT also causes the operation of relay TNE over its priorly described operate path. The release of relay CT also opens the tip and ring path between position OP1 and trunks PT1 and PT2 at contacts CT–5 and CT–6 of FIG. 3.

The release of relay CT causes the operation of relay MB of FIG. 7 over a path through contacts SRW–18, CT–10 and TN–7. In operating, relay MB causes the make busy lamp MBL to be energized at a flashing rate under control of relay FLA of FIG. 7 over a path through contacts MBA–3, MB–2 and FLA–5 to ground. The flashing lamp indicates to the operator at position OP1 that the call has been transferred to the supervisor position SP.

In operating, relay TFB also causes the release of relay TK2A by opening contact TFB–4. Relay TFB also closes a locking path for relay BCO via contacts TFB–9, TK2–7 and PO–8 to preclude the premature release of relay TK2 and the release of trunk PT2.

When relay TFB operated, it effected the operation of relay TF2 of FIG. 4 over the path through contacts TFB–6 and PO–5 to ground. In operating, relay TF2 causes lamp TRK2L of FIG. 7 to be extinguished by opening contact TF2–1 as a signal to the operator that the call on trunk PT2 has been transferred to position SP.

Relay SRW is held operated during the foregoing operations via contact SR–1, a contact on key POS RLS, and contacts SR1–1 and SRW–2 to ground. After the operator at position OP1 receives the extinguished TRK2L lamp signal, key POS RLS is released to effect the successive release of relays SRW and SRZ. Thereafter, relay MB is released by the opening of contact SRW–18. In turn, released relay MB causes lamp MBL to be extinguished by opening contact MB–2. The release of relay MB also causes the successive release of relays FST and FLA as priorly described. After these operations, if the trunk PT1 becomes idle, relay PA1 is operated as described previously for enabling a supervisory signal to be sent over trunk PT1 toward network SN to indicate that an operator is available for serving another call thereon in a manner as priorly explained. On the other hand, if trunks PT1 and PT2 are both busy, the operator at position OP1 waits for one of the trunks to become idle before resuming call service operations.

DISCONNECT OF CALL ON PRIMARY TRUNK PT1 WHICH WAS TRANSFERRED TO SUPERVISOR—CALLER DISCONNECTS FIRST

After the caller disconnects, the trunk circuit PCT1 of FIG. 2 applies a conventional high resistance bridge to the trunk conductors T1 and R1 for causing the release of relay L1 of FIG. 2. In releasing, relay L1 opens its contact L1–1 to release the slow-acting relay TH1 of FIG. 2 which in turn releases relay TAR of FIG. 4 by opening contact TH1–4.

If the supervisor trunk ST1 is being utilized for serving the call on trunk PT1 the release of relay TAR releases relay T1S of FIG. 5 by opening contact TAR–6. In releasing, relay T1S releases relays TS and A1S of FIG. 5 by opening contacts T1S–5 and T1S–4, respectively. On the other hand, if supervisor trunk ST2 is being utilized for serving the call on trunk PT1, the release of relay TAR releases relay T2S of FIG. 5 by opening contact TAR–7. In releasing, relay T2S releases relays TS and A2S of FIG. 5 by opening contacts T2S–1 and T2S–3 respectively. The release of relay A1S or A2S opens its contacts A1S–4 and A1S–5 or A2S–4 and A2S–5 to disconnect trunk ST1 or ST2, respectively, from trunk PT1 and thereby causes the switching network SN to release connections toward the caller.

The supervisor trunk selection and distribution circuit STD of FIG. 5 is notified of the caller disconnect over the conductors TT1 or TT2 by the removal of ground therefrom upon the opening of either contact TAR–6 or TAR–7. Circuit STD then extinguishes lamp SRL of FIG. 5 if both supervisor trunks ST1 and ST2 were concurrently busy prior to the caller disconnect. A number of different circuit actions occur at this stage of the circuit operation depending upon the busy-idle status of the secondary trunk PT2. If a call is in progress on trunk PT2, no further circuit functions occur until the call is terminated by the disconnect of the caller or the operator, or the call is transferred to the supervisor position SP. When a call on trunk PT2 has been transferred to the supervisor position prior to the caller disconnect on the trunk PT1, the position control circuit PCC functions to release relay TFA of FIG. 7 immediately after the priorly described release relay TH1 which opens contact TH1–3. The release of relay TFA immediately transfers the operator position trunk PT from the secondary trunk PT2 to the primary trunk PT1 by actuating the transfer contacts TFA–3, TFA–4, TFA–7 and TFA–8 of FIG. 2. Upon releasing, relay TFA releases the trunk transfer relay TF1 of FIG. 4 by opening contact TFA–12. Released relay TFA also deactuates relay FST of FIG. 7 by opening contact TFA–11. Relay FST in turn interrupts the flashing operation of relay FLA under control of the interrupter IC and by opening the contacts FST–1 and FST–2. Concurrently, relay PA1 of FIG. 6 is operated as previously described for sending a polarity reversal over the trunk PT1 and the trunk circuit PCT1 to the telephone switching network SN for indicating the availability of the trunk PT1 and operator position OP1 to receive calls. Relay PA1 operates via contacts TH1–1, TFA–1, MB–1, PR–2, TNE–2 and PO–2 to ground. The polarity reversal is controlled as previously described by transfer contacts PA1–1 to PA1–4. Thereafter, the switching network SN switches calls to the primary trunk PT1 for connection through the position control circuit PCC1 to operator position OP1 for service.

If the secondary trunk PT2 is idle when a disconnect occurs on trunk PT1, the position control circuit PCC1 proceeds to enable the operator position OP1 again to serve calls over the primary trunk PT1 and to release trunk PT2 for use by other operator positions in serving calls. Specifically, circuit PCC1 releases trunk PT2 for use by other positions by sending a signal to network SN that operator position OP1 is unavailable for serving calls on trunk PT2. The signal is polarity reversal on trunk PT2 which is sent by relay PA2 upon its release under control of the deactivation of contact TAR–5 as previously explained.

When relay TAR releases, it opens its contact TAR–8 to initiate a timing interval by timer TD of FIG. 6. This timing interval is cancelled, however, if a call is in process of being connected by network SN to trunk PT2 before relay PA2 is released as previously described. The cancellation is made under control of contact L2A–4 by virtue of the operation of relays L2, TH2 and L2A as already described. After such a call has been served, relay L2A releases and opens contacts L2A–4 to initiate the timing interval by relay TD. At the end of the timing interval, timer TD operates relay PRA of FIG. 6 in a path from ground through its winding contacts MB–4 and PR–5 to a negative potential supplied to lead TDL by timer TD. In operating, relay PRA opens its contact PRA–6 to release relay TK2 of FIG. 6 which thereupon controls the preference chain to enable another operator position in the same group to engage the shared secondary trunk PT2. The release of relay TK2 initaites the sequential release of relays TK2A and BCO of FIG. 3 by opening the contacts TK2–7 and TK2A–3. In addition, relay TK2 opens contact TK2–14 to release relay TFA which in turn deactivates the timer TD via contact TFA–16 to effect the release of relay PRA. Relay TFA also opens contact TFA–11 to release relay FST of FIG. 7 which in turn deactivates relay FLA. Relay TF1 of FIG. 4 is also released by the opening of contact TFA–12. The release of relay TFA recloses the described operating path of relay PA1 which then operates to send a polarity reversal on trunk PT1 as a position available signal toward the switching network SN for enabling it to subsequently switch calls to trunk PT1 for service.

SUPERVISOR DISCONNECTS FIRST

Supervisor position SP is equipped with a release key arrangement which enables her to release a call on either supervisor trunk ST1 or ST2. Such a disconnect is needed for example when a caller fails to disconnect upon completion of the call. The operation of the supervisor release key activates the supervisor trunk selection and distribution circuit STD of FIG. 5 over the supervisor trunk STA to deactivate relay A1S or A2S dependent upon whether the operator initiates the release on trunk ST1 or ST2 respectively over lead T1L or T2L. In releasing, the A1S or A2S relay initiates the release of relay T1S or T2S respectively by opening the respective contact A1S–7 or A2S–7 which also functions to cause the circuit STD to deenergize lamp SRL of FIG. 5 if both of the supervisor trunks ST1 and ST2 priorly had been busy. The release of relay T1S has the further function of releasing relay TS by opening contact T1S–5. Upon releasing, relay A1S or A2S opens the connections between the supervisor position SP and trunk PT1 for causing the telephone switching network to release connections toward the caller. The release of relay A1S or A2S also effects the release of relay TAR by opening contact A1S–6 to A2S–6.

The manner in which the position control circuit PCC1 thereafter functions is determined by the call processing state of the secondary trunk PT2. If the trunk is idle, the circuit functions are the same as those previously described and which occur following the release of relay TAR when a caller disconnects first. When a call on trunk PT2 is either still in progress or transferred to a supervisor at the time that relay TAR releases, relay PA1 is immediately operated to actuate its contacts PA1–1 to PA1–4 for sending a polarity reversal over trunk PT1 to indicate a position disconnect. Relay PA1 operates over a path through contacts TH1–5, TF1–7 and TAR–12 to ground. In response to the polarity reversal on trunk PT1, trunk circuit PTC1 functions to initiate the release of connections through the switching network SN toward the caller and then to apply a high resistance bridge to trunk PT1 for releasing relay L1 of FIG. 2. Upon releasing, relay L1 deactivates relay TH1 by opening contact L1–1. Released relay TH1 in turn releases relay PA1 by opening contacts TH1–5 and for sending a polarity reversal over trunk PT1 as a signal that position OP1 is not available for serving calls. While a call is in progress on trunk PT2, no further actions occur in the control circuit PCC1 because the operator at position OP1 is unavailable for serving other calls on trunk PT1. On the other hand, if a call on trunk PT2 has been transferred to the supervisor position prior to the disconnect by the operator at position OP1, the control circuit PCC1 proceeds to release relay TFA immediately after the release of relay TH1 opens contact TH1–3. In releasing, relay TFA deactivates relay TF1 by opening contact TFA–12 and successively releasing relays FST and FLA by opening contacts TFA–11 and then contacts FST–1 and FST–2. The release of relay TFA causes the reoperation of relay PA1 over the priorly described path for sending a polarity reversal under control of contacts PA1–1 to PA1–4 over trunk PT1 as a signal that position OP1 is again available for serving calls.

DISCONNECT OF CALL ON SECONDARY TRUNK PT2 WHICH WAS TRANSFERRED TO SUPERVISOR—CALLER DISCONNECTS FIRST

After the caller disconnects, trunk circuit PCT2 applies a conventional high resistance bridge to conductors T2 and R2 for causing the release of relay L2 of FIG. 2. The release of relay L2 opens its contact L2–1 to release the slow-acting relay TH2 of FIG. 2 which in turn releases relay L2A of FIG. 4. In releasing, relay L2A opens its contact L2A–1 to effect the release of relay TK2 of FIG. 6. The release of relay TK2 causes the release of relays BCO of FIG. 3 and TFB of FIG. 7 by opening contacts TK2–7 and TK2–14. As a result, other operator positions sharing the same secondary trunk PT2 are enabled to bid for trunk preference through the preference chain PRC of FIG. 6. The release of relay TFB also causes the release of relay TBR of FIG. 4 by opening contact TFB–4.

If supervisor trunk ST1 is used for serving the call on trunk PT2, the release of relay TFB releases relay T1S of FIG. 7 by opening contact TFB–6 in the auxiliary locking path of relay T1S including contact B1S–8. In releasing, relay T1S releases relays TS and B1S of FIG. 5 by opening contacts T1S–5 and T1S–4, respectively. Similarly, if trunk ST2 is used for serving the call on trunk PT2, the release of relay TFB releases relay T2S of FIG. 5 by opening contact TFB–7 in a locking path for relay T2S including contact B2S–8. In releasing, relay T2S releases relay TS and B2S of FIG. 7 by opening contacts T2S–1 and T2S–3, respectively. The release of relay B1S or B2S causes trunk PT2 to be disconnected from trunk ST1 or ST2, respectively, and thereby causes switching network SN to release connections toward the caller.

The supervisor trunk selection and distribution circuit STD of FIG. 5 is informed of the caller disconnect as priorly described over the conductors TT1 or TT2 by the removal of ground therefrom upon the opening of either contact TFB–6 or TFB–7. Circuit STD then extinguishes lamp SRL of FIG. 5 if both trunks ST1 and ST2 were concurrently busy prior to the caller disconnect.

SUPERVISOR DISCONNECTS FIRST

Position SP is equipped with a release key arrangement not shown which enables the supervisor to release a call on either trunk ST1 or ST2. The release arrangement activates circuit STD of FIG. 7 over trunk STA to deactivate relay B1S or B2S dependent upon whether the supervisor initiates the release on trunk ST1 or ST2, respectively over lead ST1L or T2L. In releasing, relay B1S or B2S initiates the release of relay T1S or T2S, respectively, by opening contact B1S–8 or B2S–8 which also functions to cause circuit STD to deenergize lamp SRL of FIG. 5 if both trunks ST1 and ST2 priorly had been busy. The release of relay T1S causes the release of relay TS by opening contact T1S–5. Upon releasing, relay B1S or B2S opens the connections between position SP and trunk PT2 for causing the telephone network SN to release connections toward the caller. The release of relay B1S or B2S also effects the release of relay TBR of FIG. 4 by opening contact B1S–7 or B2S–7.

In releasing, relay TBR operates relay PA2 of FIG. 6 over the path through contact TFB–8 and contact TBR–3 to ground. The operation of relay PA2 sends a polarity reversal over trunk PT2 as previously described as a position disconnect signal. In response thereto, trunk circuit PCT2 initiates the release of connections through network SN toward the caller and then to apply a high resistance bridge to trunk PT2 for releasing relay L2 of FIG. 2. Upon releasing, relay L2 releases relay TH2 by opening contact TH2–1. Released relay TH2 releases relay L2A by opening contact TH2–1. In turn, relay L2A initiates the successive release of both relay PA2 to send a polarity reversal over trunk PT2 as a position unavailable signal and relays TK2 and BCO for enabling other positions sharing trunk PT2 to bid for trunk preference. The release of relay TK2 successively effects the release of relays TFB and TF2 as priorly explained. At about the same time, relay PA2 releases in response to the opening of contact TK2–8.

If trunk PT1 is yet transferred to the supervisory position SP at this time, the release of relay TF2 enables relay TK2 to operate as described before and provided that trunk PT2 is not seized by another position.

It is to be understood that the hereinbefore described arrangements are illustrative of the application of principles of the invention. In light of this teaching, numerous other arrangements may be devised by those skilled in the art without departing from the spirit and scope of the invention.

What is claimed is:

1. An operator position control circuit connectable to a primary trunk for receiving incoming calls for service by an operator and a secondary trunk for receiving incoming calls for service by said operator on an overlap basis when a call on said primary trunk is transferred under control of said operator to a supervisor console for service, said secondary trunk being shared by a plurality of operator positions for serving calls on the overlap basis, and comprising the invention of means responsive to the switching of a received call on said primary trunk to a supervisor console for automatically conditioning said secondary trunk for receiving an incoming call on an overlap basis, and means responsive to the completion of the overlap call on said secondary trunk for automatically controlling the selective availability of said primary and secondary trunks for receiving a subsequent call.

2. An operator position control circuit in accordance with claim 1 wherein said controlling means includes means responsive to the completion of both said call switched to said supervisor console and said overlap call on said secondary trunk for automatically making said primary trunk available and said secondary trunk unavailable for receiving the subsequent call.

3. An operator position control circuit in accordance with claim 2 wherein said controlling means includes times means for controlling said making means for automatically making said primary trunk available for receiving said subsequent call after a timed interval following the completion of said overlap call on said secondary trunk to preclude a premature call termination on said secondary trunk.

4. An operator position control circuit in accordance with claim 1 further comprising means for automatically switching a received call on said primary trunk to one of a plurality of supervisor trunks to said supervisor console, and said switching means being further effective for automatically switching a call served on an overlap basis on said secondary trunk to another one of said plurality of supervisor trunks to said supervisor console.

5. An operator position control circuit in accordance with claim 4 wherein said controlling means is responsive to the completion of a call switched to said one of said supervisor trunks for automatically making said primary trunk available for receiving a subsequent call and prior to the completion of the call on said secondary trunk switched to said other one of said supervisor trunks.

6. An operator position control circuit in accordance with claim 5 wherein said controlling means further includes means selectively responsive to the completion of said overlap call on said secondary trunk switched to said other one of said supervisor trunks before the completion of a call on said primary trunk for automatically making said secondary trunk available for serving another call on an overlap basis.

7. An operator position control circuit in accordance with claim 6 further comprising a preference arrangement for permitting said operator positions to be connected to said secondary trunk on a one at a time basis for serving calls on an overlap basis, and said arrangement being selectively responsive to the completion of said call on said secondary trunk switched to said other one of said supervisor trunks for immediately enabling said operator positions sharing said secondary trunk to compete for its use in serving an overlap call.

8. Equipment for the operator service of calls and for the transfer of such calls to a supervisor, comprising a plurality of operator positions, a plurality of trunks shared by said positions and extending to a supervisory operator console, a plurality of primary trunks for receiving incoming calls and each of the primary trunks being connected to an individual one of said positions, a secondary trunk for receiving incoming calls and being shared by said positions for serving calls on an overlap basis, each one of said positions comprising means effective for automatically switching a received call from said connected primary trunk to one of said shared trunks extending to said console, means subsequently activated by said switching means for automatically enabling said one position to serve on an overlap basis a call received over said secondary trunk, and means responsive to the completion of serving the switched call and the call served on an overlap basis for enabling said one position subsequently to serve calls received over the connected primary trunk.

9. In combination, a first operator position, means responsive to the receipt of an incoming call on a primary trunk for switching said call to said position for service, means subsequently controlled by said position for automatically transferring said call to a supervisor for service, a secondary trunk shared by said position and a plurality of other operator positions for selectively serving calls on an overlap basis, and means responsive to the operation of a key at said first position following the transfer of said call on said primary trunk to said supervisor for automatically assigning said secondary trunk exclusively to said first position for serving subsequent calls on an overlap basis until the completion of said transferred call.

10. In combination, the invention of claim 9 further comprising a plurality of supervisor trunks for transferring a call to a supervisor for service and means for automatically indicating at said first operator position the availability of one of said supervisor trunks.

11. In combination, the invention of claim 9 further comprising means for automatically reconnecting said first operator position to said primary trunk on completion of said transferred call and on completion of any call on an overlap basis on said secondary trunk.

12. In combination, a plurality of incoming trunks for receiving incoming calls for service at a first operator position, a plurality of supervisor trunks shared by said first operator position and other positions for extending received calls from said incoming trunks to a supervisor for service, and switching means responsive to the operation of a key at said first position for automatically connecting an available one of said supervisor trunks to a calling one of said incoming trunks for supervisor call service.

13. The combination in accordance with claim 12 wherein said incoming trunks include a secondary trunk shared by said first and other operator positions for serving calls on an overlap basis, and further comprising means automatically responsive to another key operation upon a transfer of a call on said primary trunk to one of said supervisor trunks for selectively preferring said first operator position over said other positions for exclusively serving overlap calls on said secondary trunk until the transferred call on said primary trunk is completed.

14. The combination in accordance with claim 13 further comprising a position trunk to said first operator position being individually connected to said primary trunk for serving a received call thereon, means automatically activated by said preferring means in response to the preferring of said first position for exclusively serving overlap calls on said secondary trunk for disconnecting said primary trunk from said position trunk and connecting said position trunk to said secondary trunk for overlap call service by said first position.

15. The combination in accordance with claim 14 further comprising means responsive to the completion of an overlap call on said secondary trunk for selectively enabling said secondary trunk to receive another call for connection to said position trunk for service by said first operator position, and means selectively effective following the automatic connection of said secondary trunk to an available one of said supervisor trunks and upon the completion of a call on said secondary trunk for controlling said preferring means to enable another of said operator positions to be preferred over said first position for exclusively serving overlap calls on said secondary trunk.

16. The combination in accordance with claim 14 further comprising means responsive to the completion of both an overlap call on said secondary trunk and a call on said primary trunk connected to one of said supervisor trunks for automatically transferring said position trunk from said secondary trunk for connection to said primary trunk on a subsequent call received thereon.

17. Operator position equipment comprising a first operator trunk, an operator position trunk, means responsive to the receipt of a call on said first trunk for connecting said calling first trunk to said position trunk for operator service, means responsive to a first operator key actuation for automatically connecting said call to a supervisor console for supervisor call service, a second operator trunk for receiving overlap calls, and means controlled by a second operator key actuation for automatically transferring said position trunk from said first to said second trunk for operator call service on an overlap basis.

18. Operator position equipment comprising a plurality of operator positions, a plurality of position trunks, a plurality of operator position control circuits, each of said circuits being connected over an individual one of said trunks to an individual one of said positions, a plurality of primary trunks for receiving incoming calls and each primary trunk being connected to an individual one of said position control circuits, each of said control circuits comprising means responsive to the receipt of an incoming call on the connected primary trunk for switching said call over the connected individual one of said position trunks to the individual one of said positions, a supervisor position, a plurality of supervisor trunks shared by each of said control circuits for individually extending said primary trunks to said supervisor position, means operable for selecting an available one of said supervisor trunks for connection to a calling one of said primary trunks, each one of said control circuits including means responsive to a first operator key actuation for effecting the operation of said selecting means to select any available one of said supervisor trunks, and means responsive to the selection of said one supervisor trunk for automatically connecting the selected trunk to said primary trunk connected to said one control circuit for supervisor call service.

19. Operator position equipment in accordance with claim 18 further comprising a secondary trunk for receiving incoming calls and said secondary trunk being shared by a plurality of said operator position control circuits, and wherein each one of said control circuits further includes means responsive to a second operator key actuation for automatically transferring said position trunk individual to said one control circuit from said connected primary trunk to said shared secondary trunk for serving an incoming call thereon.

20. Operator position equipment in accordance with claim 19 further comprising a preference and lockout arrangement controlled by each of said operator position control circuits for automatically enabling only one of said primary trunks to be connected to said selected supervisor trunk.

21. Operator position equipment in accordance with claim 20 wherein each of said operator position control circuits further includes means responsive to the completion of calls on both said connected primary trunk and said secondary trunk for automatically operating said transferring means to retransfer said connected primary trunk to said individual one of said position trunks, and means effective upon said retransfer for automatically making said shared secondary trunk available for transfer to another of said primary trunks.

22. Operator position equipment in accordance with claim 20 wherein each of said operator position control circuits further includes means responsive to a subsequent one of said first operator key actuations for effecting the operation of said selecting means to select another available one of said supervisor trunks, and means responsive to the selection of said other one of said supervisor trunks for automatically connecting said selected other supervisor trunk to said shared secondary trunk for supervisor call service.

No references cited.

WILLIAM C. COOPER, Primary Examiner